July 15, 1958        B. J. MILLER        2,843,112
LIGHT TRANSMITTING MEANS FOR ENDOSCOPES
Filed June 30, 1954        2 Sheets-Sheet 1
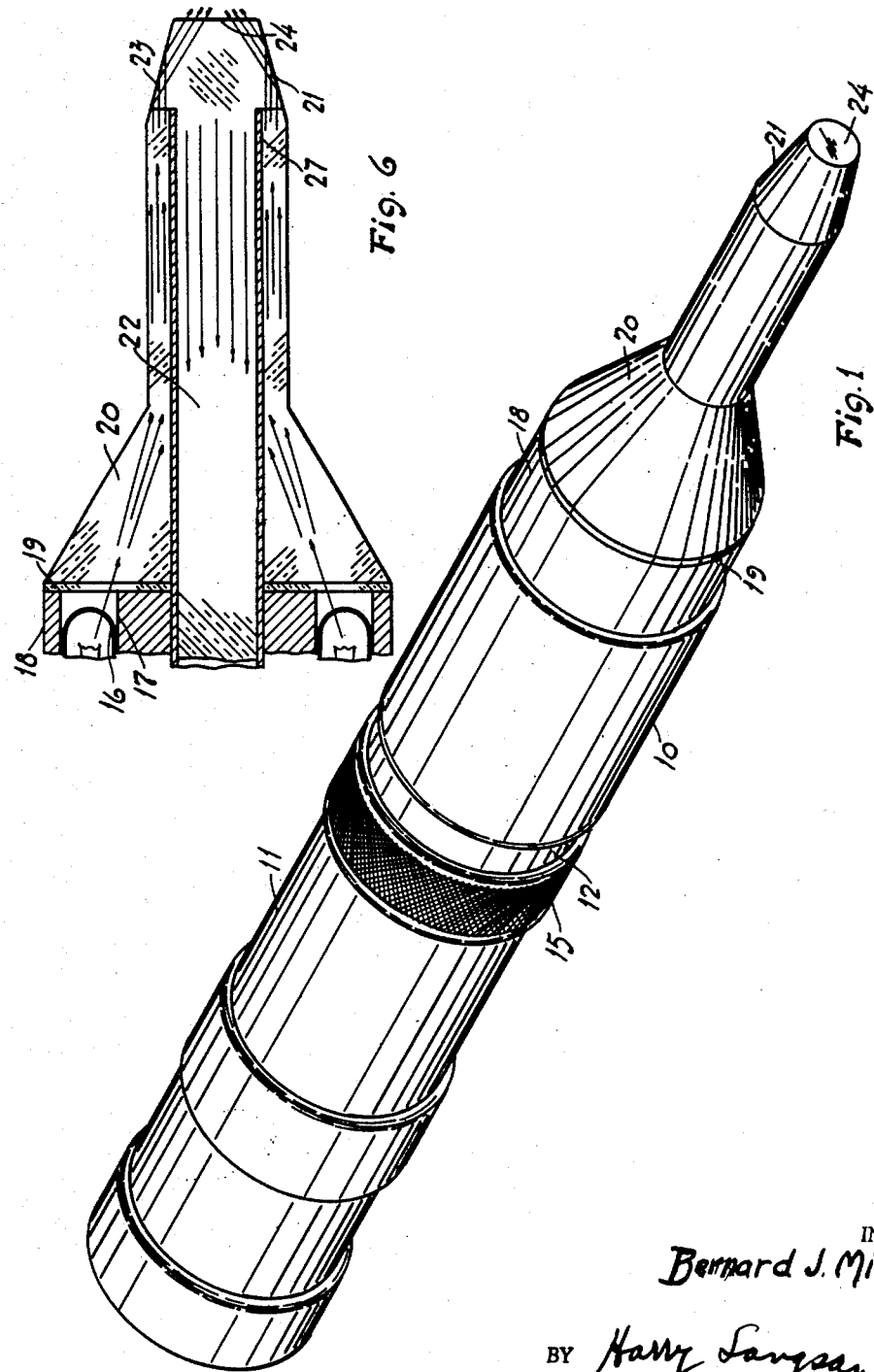
INVENTOR
Bernard J. Miller
BY Harry Langsam
ATTORNEY July 15, 1958 B. J. MILLER 2,843,112
LIGHT TRANSMITTING MEANS FOR ENDOSCOPES
Filed June 30, 1954 2 Sheets-Sheet 2
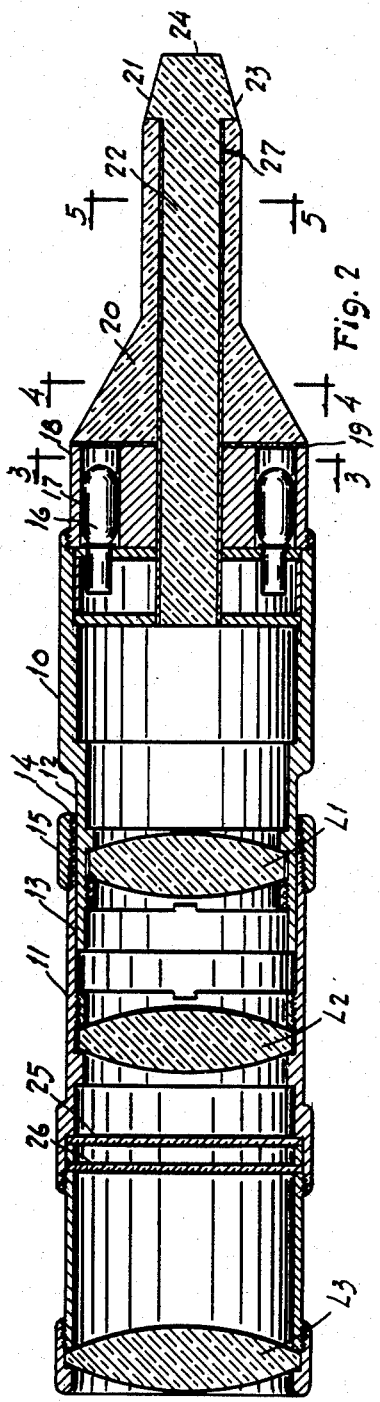
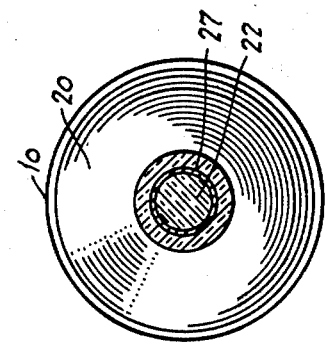
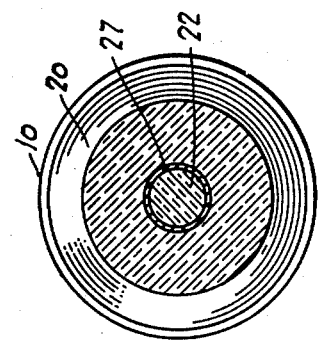
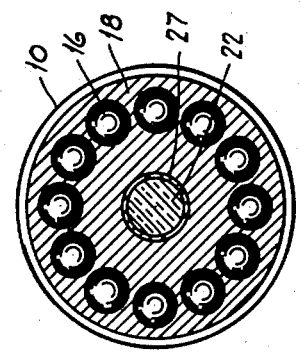
INVENTOR
Bernard J. Miller
BY Harry Langsam
ATTORNEY

United States Patent Office 2,843,112
Patented July 15, 1958

2,843,112

LIGHT TRANSMITTING MEANS FOR ENDOSCOPES

Bernard J. Miller, Philadelphia, Pa.

Application June 30, 1954, Serial No. 440,460

9 Claims. (Cl. 128—6)

My invention relates to devices used by surgeons in the performance of operations, and relates more particularly to devices used to illuminate and permit observation of the areas or tissues being operated upon, especially when such areas are within cavities of organs within the body.

The performance of precise operations within the organs of the body has been limited by the inability of the surgeon to observe the structure being operated upon. In the case of intracardiac operations, the employment of digital palpation has had limited success, also attempts at observing the intracardiac construction with exclusion of the circulation of the blood through the heart, either by use of a heart-lung machine or by the arrest of the circulation by hypothermia has been employed. One of the prior art devices used in operations of this kind is an optically clear rod which is inserted into the cardiac chamber. In operations where the surgeon employs such a rod, it is necessary for the operator to firmly press the end of the rod against the structure being operated upon in order to exclude blood from the line of vision, for visible light cannot penetrate the thinnest film of whole blood. Other observing devices have been used, however, due to the large size of a practical device, prolonged observation is not possible due to the interference with cardiac output, also when cutting instruments are to be used in connection with the prior art observing devices it is necessary to withdraw the observing device a sufficient distance to permit employment of the cutting instrument. The consequent flooding of the field of operation by blood obstructs direct vision, making it impossible for the surgeon to continuously observe the structure or tissue operated upon.

In my improved device, I have overcome the objections to the prior art devices and I have devised an endoscope that illuminates the structure with a light that will penetrate whole blood and permit continuous observation of the structure being operated upon. My improved endoscope also provides for magnification of the structure image.

It is, therefore, an object of my invention to devise an endoscope with an inherent illuminating means arranged to illuminate the structure being operated upon.

Another object of my invention is to devise an endoscope that has a relatively small end for insertion into the cavity of the organ being operated upon, thereby avoiding interference with the normal function of the organ.

Another object of my invention is to devise an endoscope that by a series of lenses, magnifies and presents an image of the structure being operated upon, the image being in upright and relative position to the structure being operated upon so that the surgeon can manipulate his hands and instruments in a manner that avoids confusion and mishap.

Another object of my invention is to construct an endoscope having a light source that projects an invisible light ray of a wave length that will permit the light ray to penetrate whole blood and be reflected by the structure on which the ray impinges, the reflected light ray conveying the image of the structure through lenses to converting means where the invisible light rays are changed to visible light rays for the observation of the operator.

Another object of my invention is to construct an endoscope having adjusting means so that the reflected image can be focused on the viewing screen of the endoscope.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawings, in which:

Fig. 1 is an isometric view of my improved endoscope.

Fig. 2 is a sectional elevational view of the endoscope taken along a longitudinal center line.

Fig. 3 is a sectional view of the endoscope taken at line 3—3 of Fig. 2 showing the light source of the endoscope.

Fig. 4 is a sectional view of the endsocope taken along line 4—4.

Fig. 5 is a sectional view of the endoscope taken along line 5—5.

Fig. 6 is a sectional view of the operating end of the endoscope showing diagrammatically the path of the light rays through the endoscope end elements.

Referring in greater detail to the illustrations, I disclose my improved endoscope comprised of a main barrel portion 10 and secondary barrel portion 11. The main barrel 10 and secondary barrel 11 are arranged so that a contracted portion 12 of the main barrel interfits with the bore 13 of the secondary barrel 11. The end 14 of the secondary barrel portion is threaded and the threaded portion is provided with longitudinal cuts (not shown) so that a clamping ring 15 interfitting with the tapered threads on the end 14 of the secondary barrel portion 11 so that longitudinal adjustment can be made in the relative positions of the main and secondary barrel portions. This longitudinal adjustment is provided for focusing of the endoscope as hereinafter described.

The illumination source of the endoscope is a multiplicity of tungsten filament electric lights 16 arranged in holes 17 in an illumination ring 18 secured in the operating end of the main barrel portion 10. Positioned over the holes 17 and adjacent to the end of the illumination ring 18 is a transparent filter 19 made of a material that passes on infra-red light rays. All other light rays are blocked by the filter 19. The infra-red light rays from the lights 16 pass through the filter 19, see Fig. 6, and enter the transparent media of the endoscope probe.

The endoscope probe is comprised of a tapered cylinder 20 of transparent material. The cylinder receives the light rays and conducts the light rays between the outer cylindrical surface and the inner cylindrical surface, as the angle at which the light rays impinge on the inner and outer surfaces of the tapered cylinder 20 being greater than the critical angle of refraction, the light rays are reflected back into the media and follow the general course as indicated by the arrows in Fig. 6. As the light rays leave the end of the tapered cylinder 20, they enter the enlarged end 21 of the transparent viewing rod 22. At this point, the light rays are reflected by the conical surface 23 of the enlarged end 21 of the viewing rod 22, and are diffused over the object end 24 of the endoscope and illuminate the surface of the structure under observation.

The image of the illuminated surface under observation is transmitted back through the transparent viewing rod 22 as indicated by arrows in Fig. 6 onto the adjustable collimating lens system L1 and L2, where the image is inverted and enlarged and projected onto an infra-red sensitive semi-transparent surface 25. A phosphorous surface 26 positioned adjacent to the infra-red surface 25 converts the infra-red rays into visible rays. The semi-transparent surface 25 and the phosphorous surface 26 function as an emissive photo-electric cell. The semi-transparent cathode 25 of the image converter tube is sensitive to the reflected transmitted infra-red image of the surface under observation. The electrons released from the cathode 25 as the result of the infra-red light image are then accelerated by a high electromotive force and impinge upon the fluorescent phosphorous anode 26. The image appears on the phosphorous anode 26 in shade of green and is visible to the human eye. This image is further magnified by the eyepiece lens L3. A barrier 27 is provided between the tapered cylinder 20 and the viewing rod 22 to prevent transmission of light between these two elements.

From the above description, it will be observed that my improved endoscope comprises a light source, a means of transmitting incident and reflected infra-red light into and from human organ cavities, and a means of converting the image of the surface under observation into an image capable of being observed by the human eye.

Although my invention has been described in considerable detail, such description is intended as being illustrative rather than limiting, since the invention may be variously embodied, and the scope of the invention is to be determined as claimed.

I claim as my invention:

1. An endoscope comprising a main barrel and a secondary barrel, wherein said barrels telescope one another, a plurality of electric lights concentrically arranged within said main barrel, a transparent filter associated with said main barrel adjacent said electric lights and transmitting only infra-red light rays, an endoscope probe joined to said main barrel adjacent said filter, said probe being comprised of a tapered cylinder of transparent material, a transparent viewing rod adjacent said probe and secured thereto, an infra-red sensitive semi-transparent lens mounted within said secondary barrel, a phosphorous surface mounted within said secondary barrel adjacent said infra-red lens, whereby the infra-red rays are converted into visible rays.

2. An endoscope to visually observe structure being operated upon within the cardiac chamber without the exclusion of blood circulation comprising a barrel for holding a plurality of lens, an illuminating ring at one end of said barrel wherein there are a plurality of light bulbs circumferentially arranged, an infra red transparent filter associated with said barrel adjacent said light bulbs which passes infra red rays of light, a probe mounted upon said barrel adjacent said infra red filter to direct infra red rays of light to a viewing end of said probe, a cathode lens sensitive to infra red rays of light located at the opposite end of said barrel and a fluorescent phosphorus anode mounted within said barrel adjacent said cathode which enables the image to be visible to the eye in the shade of green.

3. An endoscope to visually observe structure being operated upon within the cardiac chamber without the exclusion of blood circulation comprising a barrel for holding a plurality of lense, an illuminating ring at one end of said barrel wherein there are a plurality of light bulbs circumferentially arranged, an infra red transparent filter associated with said barrel adjacent said light bulbs which passes infra red rays of light, a probe mounted upon said barrel adjacent said infra red filter to direct infra red rays of light to a viewing end of said probe, a cathode lens sensitive to infra red rays of light located at the opposite end of said barrel, and a fluorescent phosphorous anode mounted within said barrel adjacent said cathode which enables the image to be visible to the eye in the shade of green, said probe having a hollow internal bore and a tapered cylindrical outer surface of light transmitting material, an elongated hollow cylindrical portion integrally formed with said tapered cylindrical part, a solid cylindrical viewing tube having one end enlarged to be tapered on its outer surface and planar at its viewing end, said solid viewing tube located within said probe internal bore and having its enlarged end projecting from said elongated hollow cylindrical portion.

4. The invention of claim 3 wherein collimating lenses are located within said barrel between said transparent filter and said cathode.

5. The invention of claim 4 wherein a magnifying lens is located adjacent the open end of said barrel and said fluorescent phosphorus anode.

6. A light transmitting means for an endoscope having a barrel with a transparent probe mounted thereon comprising a plurality of electric lamps concentrically arranged within said barrel adjacent said probe, an infra red transparent filter associated with said barrel intermediate said electric lamps and said probe, said filter transmitting infra red rays of light and being opaque to visible rays of light, a cathode lens sensitive to infra red rays, said cathode lens being mounted at the opposite end of said barrel from said probe, and a fluorescent phosphorous anode mounted within said barrel adjacent said cathode lens whereby an object placed adjacent said probe may be visibly imaged upon said phosphorous anode.

7. A light transmitting means for an endoscope having a barrel with a transparent probe mounted thereon, electric lamp means within said barrel adjacent said probe, infra red filter means within said barrel intermediate said lamp means and said probe, a cathode lens mounted within the opposite end of said barrel, said cathode lens being sensitive to infra red rays and phosphorus means mounted within said barrel adjacent said cathode lens whereby an object adjacent said probe may be imaged upon said phosphorus means and visibly viewed thereon.

8. The invention of claim 7 wherein collimating lenses are axially mounted within said barrel intermediate said filter means and said cathode lens.

9. The invention of claim 8 wherein a magnifying lens is mounted upon the open end of said barrel adjacent said phosphorous means.

References Cited in the file of this patent

UNITED STATES PATENTS

| 2,102,274 | Larimore | Dec. 14, 1937 |
| 2,297,799 | Pifer | Oct. 6, 1942 |
| 2,593,925 | Sheldon | Apr. 22, 1952 |
| 2,699,770 | Fourestier et al. | Jan. 18, 1955 |
| 2,764,148 | Sheldon | Sept. 25, 1956 |

FOREIGN PATENTS

| 14,508 | Great Britain | Jan. 31, 1907 |